(12) United States Patent
Benzing (10) Patent No.: US 9,022,709 B2
(45) Date of Patent: May 5, 2015

(54) SCREW WITH ANTI-LOOSENING MEANS (75) Inventor: Christian Benzing, Stuttgart (DE)

(73) Assignee: Hugo Benzing GmbH & Co. KG, Korntal-Münchingen ( * ) Notice: Subject to any disclaimer, the term of this patent is extended or adjusted under 35 U.S.C. 154(b) by 0 days.

(21) Appl. No.: 14/007,595

(22) PCT Filed: Mar. 8, 2012

(86) PCT No.: PCT/EP2012/054017
§ 371 (c)(1),
(2), (4) Date: Sep. 25, 2013

(87) PCT Pub. No.: WO2012/130583
PCT Pub. Date: Oct. 4, 2012

(65) Prior Publication Data
US 2014/0017027 A1    Jan. 16, 2014

(30) Foreign Application Priority Data
Mar. 25, 2011    (DE) .......................... 10 2011 001 564

(51) Int. Cl.
*F16B 39/32*    (2006.01)
*F16B 39/24*    (2006.01)
*F16B 39/26*    (2006.01)

(52) U.S. Cl.
CPC ................. *F16B 39/24* (2013.01); *F16B 39/26* (2013.01); *F16B 39/32* (2013.01); *Y10S 411/9292* (2013.01)

(58) Field of Classification Search
CPC ........... F16B 39/24; F16B 39/26; F16B 39/32
USPC ........... 411/119, 372, 150, 261, 929.2, 371.1, 411/371.2, 353
See application file for complete search history.

(56) References Cited

U.S. PATENT DOCUMENTS 217,692 A * 7/1879 Kator ............................ 411/133
606,582 A * 6/1898 Rohlin .......................... 411/195
(Continued)

FOREIGN PATENT DOCUMENTS

DE          212561          2/1909
DE      699 01 105 T2    11/2002
(Continued)

OTHER PUBLICATIONS

English machine translation of FR 1 285 107 (A), Patent Translate powered by EPO and Google, European Patent Office available at http://translationportal.epo.org/emtp/translate/?ACTION= description-retrieval&COUNTRY=FR&ENGINE=google&FORMAT= docdb&KIND=A&LOCALE=en_EP&NUMBER=1285107 &OPS=ops.epo.org/3.1&SRCLANG=fr&TRGLANG=en, (retrieved from internet on Aug. 24, 2014).*

(Continued)

*Primary Examiner* — Gay Ann Spahn
(74) *Attorney, Agent, or Firm* — Pauley Petersen & Erickson (57) ABSTRACT

A screw with anti-loosening means, which includes a securing element with a ring portion and that can be inserted about a shaft of the screw under a head thereof and, with the screw in a state in which it is screwed on a base, prevents the screw from being turned back counter to a screwing-in direction. The securing element has on the ring portion, on a side facing the surface of the base, at least one projection which can be pressed into the surface when screwing in the screw. The securing element can have an outer circumferential region of the ring portion, with finger-like extensions which, with the securing element in the inserted state, extend along the circumference of the head and under spring-elastic forces of the securing element, contact a surface structure of the body that has an inhibiting action counter to the screwing-in direction. The extensions can have inwardly bent-off end portions which engage over the head, or a circumferential portion thereof protruding radially thereon, on an upper side thereof facing away from the shaft.

18 Claims, 5 Drawing Sheets

(56) References Cited

U.S. PATENT DOCUMENTS

| | | | |
|---|---|---|---|
| 812,497 A * | 2/1906 | Janke | 411/131 |
| 998,514 A * | 7/1911 | Houghton | 411/197 |
| 1,317,567 A * | 9/1919 | Fewster | 411/198 |
| 2,124,249 A * | 7/1938 | Guiducci | 411/114 |
| 2,128,429 A * | 8/1938 | Olson | 411/123 |
| 2,147,210 A * | 2/1939 | Olson | 411/131 |
| 2,227,464 A * | 1/1941 | Olson | 470/3 |
| 2,561,679 A * | 7/1951 | Waller | 411/148 |
| 2,746,506 A * | 5/1956 | Poupitch | 411/134 |
| 2,855,013 A * | 10/1958 | Lillard | 411/201 |
| 3,133,580 A * | 5/1964 | Katz | 411/134 |
| 3,175,462 A | 3/1965 | Disley | |
| 3,190,334 A * | 6/1965 | Wigam | 411/131 |
| 3,225,808 A * | 12/1965 | Gutshall | 411/232 |
| 3,385,341 A | 5/1968 | Garstkiewicz | |
| 3,419,057 A | 12/1968 | Hogan | |
| 4,812,094 A * | 3/1989 | Grube | 411/134 |
| 4,892,429 A | 1/1990 | Giannuzzi | |
| 5,606,753 A | 3/1997 | Hashimoto | |
| 5,618,143 A * | 4/1997 | Cronin et al. | 411/220 |
| 5,967,724 A | 10/1999 | Terry | |
| 6,059,486 A | 5/2000 | Latulipe | |
| 6,350,094 B1 * | 2/2002 | Shiokawa et al. | 411/114 |
| 6,712,031 B2 * | 3/2004 | Harada et al. | 123/90.39 |
| 7,478,986 B2 * | 1/2009 | Bushell et al. | 411/198 |
| 7,955,036 B2 | 6/2011 | Palm | |
| 7,993,086 B2 * | 8/2011 | Kruse et al. | 411/141 |
| 8,069,996 B2 * | 12/2011 | Wu | 211/70.6 |
| 8,216,076 B2 | 7/2012 | Andersson | |
| 8,425,169 B2 | 4/2013 | Burtsche et al. | |
| 2005/0025604 A1* | 2/2005 | Slesinski et al. | 411/112 |
| 2005/0081578 A1* | 4/2005 | Yoon | 68/131 |
| 2006/0275098 A1* | 12/2006 | Kramer | 411/155 |
| 2007/0110542 A1 | 5/2007 | Weimann et al. | |
| 2011/0170983 A1* | 7/2011 | Day et al. | 411/370 |

FOREIGN PATENT DOCUMENTS

| | | |
|---|---|---|
| DE | 10 2005 054 471 A1 | 5/2007 |
| DE | 10 2006 029 253 B3 | 4/2008 |
| DE | 20 2009 011 269 U1 | 12/2009 |
| DE | 10 2008 056 368 A1 | 5/2010 |
| DE | 20 2010 009 496 U1 | 10/2010 |
| DE | 20 2007 019 121 U1 | 11/2010 |
| EP | 1 058 0155 A1 * | 12/2000 |
| EP | 1 464 853 A1 | 10/2004 |
| EP | 2 110 567 A2 | 10/2009 |
| FR | 1.285.107 | 3/1961 |
| GB | 2 208 417 A | 3/1989 |

OTHER PUBLICATIONS

English Abstract of EP 1 464 853 (A1), Espacenet, European Patent Office. (retrieved from internet on Aug. 24, 2014).*

* cited by examiner

SCREW WITH ANTI-LOOSENING MEANS

BACKGROUND OF THE INVENTION

1. Field of the Invention

This invention relates to a screw with anti-loosening means, which has a securing element with a ring section and thus can be placed around a shaft of the screw under a head of the screw, and when the screw is screwed to a base prevents the screw from being turned back counter to a tightening direction. On the side of the ring section facing an associated surface of the base, the securing element has at least one projection that can be pressed into the surface as the screw is screwed in.

2. Discussion of Related Art

A screw with an anti-loosening means is disclosed in European Patent Reference EP 2 110 567 A2. In one embodiment (FIGS. 27, 28), the anti-loosening means has a ring section under the screw head, with an underside oriented toward a base having sharp projections, which as the screw is tightened, are pressed into the associated surface of the base oriented toward it. In another embodiment (FIGS. 47, 48), the underside of the ring section has tabs that engage in an oblong hole in the base and on its top surface has a cylindrical ring that has tabs punched out from it, which point in the circumferential direction and cooperate with an inhibiting structure of the screw. This design is relatively complex and even when used, unfavorable situations can arise, which result in a disadvantageous operation.

U.S. Pat. No. 3,419,057 A discloses a screw with an anti-loosening means, which has a ring-shaped disk having a tab protruding radially from the side, which engages in a groove, and has a projection, which is oriented axially relative to the screw head and cooperates with an inhibiting structure provided on the circumference of the screw head. Such design does not provide a reliable hold on a base with a flat surface and disadvantages may also arise during operation.

Another screw with an anti-loosening means is disclosed in German Patent Reference DE 10 2006 029 253 B3. The anti-loosening means has a securing element that can be placed under a head of the screw around a threaded shaft, which is embodied in the form of a washer that is bent in an initial state and is of a plastically deformable material. The anti-loosening means secures the screw to prevent it from loosening through reverse rotation.

Other different anti-loosening means for screws, which are based on inhibiting structures that act between the screw head or a nut and a retaining washer or are based on a spring-elastic action are disclosed in German Patent References DE 20 2007 019 121 U1, DE 20 2009 011 269 U1, DE 20 2010 009 496 U1, DE 10 2005 054 471 A1, DD 212 561, DE 699 01 105 T2, and DE 10 2008 056 368 A1.

Often, screws are used for fastening to different items or for different specific uses in which a spring action or simple surface structures that engage with each other, such as by means of prongs, are not sufficient to achieve a reliable securing. For example, screws or nuts with such an anti-loosening means can in connection with different surfaces, which in turn are, for example, soft or elastic, come loose in unfavorable circumstances such as cases involving vibrations or jolting.

SUMMARY OF THE INVENTION

One object of this invention is to provide a screw with an anti-loosening means of the type mentioned above but which, with a simple operation, even in connection with different surface materials of the base, ensures better prevention of a loosening due to a reverse rotation of the screw and to provide a corresponding screw and a corresponding securing element.

The above and other objects are attained with the features described in this specification and in the claims. In this case, the securing element has finger-like appendages in the outer circumferential region of the ring section, which when the securing element is in the installed position, extend along the circumference of the head and, under spring-elastic forces of the securing element, form contact with a surface structure of the head that exerts an inhibiting action in the direction opposite from the tightening direction. The appendages have end sections that are bent inward, which embrace the head or a circumferential section of the screw that protrudes from it radially or is delimited by a circumferential groove, in which the inhibiting surface structure is embodied, on its top surface oriented away from the shaft.

With the appendages along the circumference or circumferential surface of the head and their cooperation with the surface structure of the head, the spring-elastic forces in connection with the projections that can be pressed into the surface produce a reliable anti-loosening means, which continues to reliably prevent a loosening due to a reverse rotation of the screw or alternatively of a nut, even with softer surface materials of the foundation or in the event of material fatigue. The surface structure of the head or the like, even with a nut, can extend for example over only a lower circumferential region of the head or nut that is oriented toward the surface of the base, is radially expanded, or is delimited by a circumferential groove and thus forms or constitutes an embraceable shoulder so that a tool can be placed onto it in the upper circumferential region. Alternatively, a recessed or raised tool-receiving socket can be provided in the central region of the top surface of the head. By means of inwardly-bent end sections of the appendages, the securing element is always held in captive fashion and secured to the screw head or nut in an easily maneuverable way.

In one advantageous embodiment, the appendages themselves are embodied as spring-elastic. An alternative to the spring-elastic appendages would be, for example, a slotted ring section, which is itself spring-elastic so that the appendages are deflected outward in spring-elastic fashion during the tightening phase and can travel into the surface structures of the head or the screw. However, with such a deflection of the ring sections themselves, it is disadvantageous that the press-in projections are almost moved radially in the surface and this has a negative effect on their engagement in the surface.

If the clearance between the ring section and the bent end section corresponds to at least the height of the head or shoulder in the axial direction of the screw, then this produces a reliable, play-free seating of the securing element against the screw head or possibly a nut.

Advantageous embodiments include the securing element manufactured as a stamped and bent part or as a molded part of metal or as a molded part of plastic.

For the function and manufacture, it is advantageous for the appendages to be bent in the outer circumference region and/or the at least one projection bent in an inner circumferential region of the ring section.

Various embodiments include the surface structure with the inhibiting action embodied on the circumference surface of the head and/or on its top surface oriented away from the shaft.

For the function, it is advantageous for the surface structure with the inhibiting action to have flat flanks that slope downward in the tightening direction, which transition into one another by means of steeper flanks that slope downward opposite from the tightening direction. This design achieves a simple tightening of the screw while reliably securing it to prevent loosening. During the tightening process, the securing element is secured early with its projections in the surface and does not rotate along with the screw.

In one embodiment the flat flanks on the circumferential surface of the head are in cross-section rectilinear or convex toward the outside.

For the function, it is also advantageous for the breadth of the appendages in the tightening direction to be at least as great as the breadth of the flat flanks.

In another embodiment of this invention, the appendages are broad in the circumferential direction and are oriented so that they cross the circumference line in accordance with the contour of the flat flanks, or the appendages are broad in the radial direction. The breadth of the appendages in the radial direction also makes it possible for the securing element to be advantageously manufactured in the form of a stamped and bent part.

If the appendages transition into the ring section by a transition section that bends outward, then this promotes the spring action of the appendages and the associated function of the anti-loosening means and facilitates their use.

To achieve a rapid fixing of the securing element to a base during the tightening process and to prevent a loosening by a reverse rotation, it is also advantageous if the press-in projections are provided with or have press-in tips.

A securing element according to embodiments of this invention can advantageously replace a worn securing element or can be used as needed in connection with screws or nuts.

In one embodiment of this invention, the securing element comprises an anti-loosening means in connection with a nut, and the nut has a surface structure on its circumference surface, which cooperates with the appendages.

BRIEF DESCRIPTION OF THE DRAWINGS

This invention is explained in greater detail below in view of embodiments of this invention with reference to the drawings, wherein.

DETAILED DESCRIPTION OF THE INVENTION

Figure 1A:
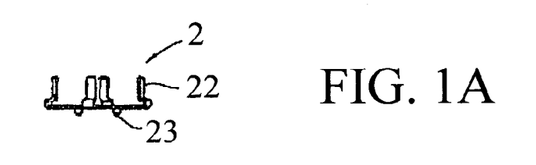
FIGS. 1A-D show a securing element in side views and top views.
Figure 1B:
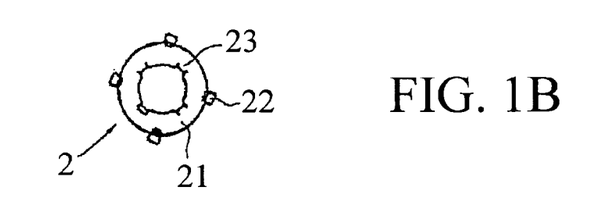
Figure 1C:
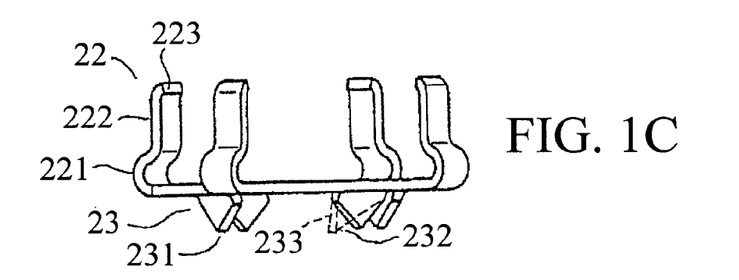
Figure 1D:
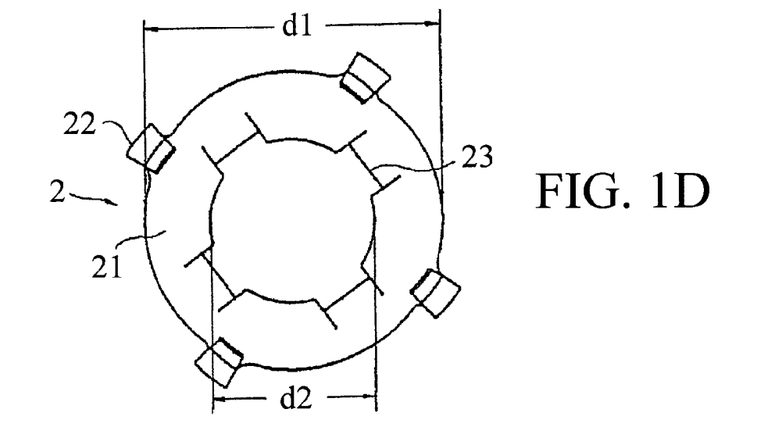
Figure 2A:
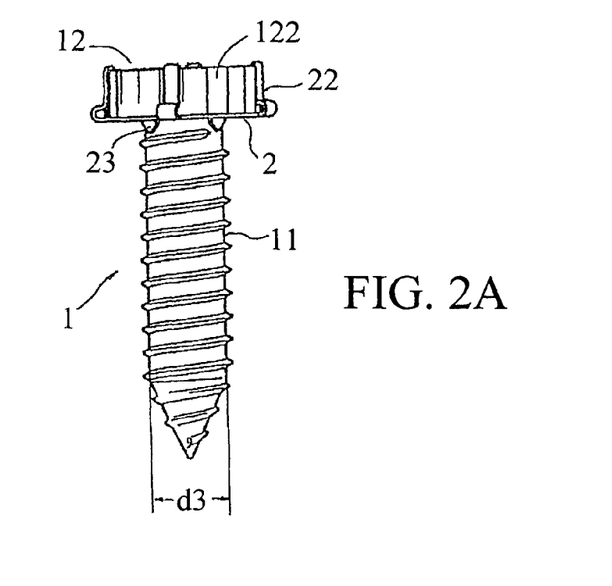
FIG. 2A shows a screw with anti-loosening means including a securing element in a side view.

FIG. 2A shows a screw with anti-loosening means, such as a securing means that prevents the screw 1 from coming unscrewed by itself in the direction opposite from its tightening direction. The screw 1 is composed of a shaft 11 with a thread and a head 12, which is concentric to the shaft 11 and has a circumference surface that is roughly cylindrical in the exemplary embodiment, but which has a structured cross-sectional contour, head contour 122, and with it, constitutes or forms a component of the anti-loosening means. On its top surface oriented away from the shaft 11, the head 12, which is flat in this instance, is provided with or has a recessed tool-receiving socket 121 in the center. On the underside of the head 12 oriented away from the top surface, a securing element 2 is placed with its ring section 21 encompassing the shaft 11 and on its outer circumference, is provided with or has bent finger-like appendages 22 that extend along the head contour 122 and on its underside, in or close to the inner edge region here, is provided with or has fixing elements 23 pointing downward away from the head 12, with projections that can be pressed into the surface material of a base or foundation, such as a work piece.

In the embodiment shown, as the screw 1 is screwed in, the press-in projections 231 of the securing element 2, which are preferably embodied as sharp, engage in the surface early while the appendages 22 slide along the surface structure of the head contour 122 and the securing element is prevented from rotating along with the tightening motion of the screw 1. As the appendages 22 that rest against the surface structure or head contour 122 are sliding along it, the projections of the ring section 21 of the securing element 2 are pressed increasingly into the surface of the foundation. For this reason alone, the securing element 2 also cannot rotate in the direction opposite from the tightening direction of the screw 1. At the same time, the appendages 22 resting against the head contour 122, by cooperating with the surface structure, prevent a reverse rotation of the screw in the loosening direction.

As shown in FIGS. 1A-1D, the ring section 21 in the present instance is embodied in the form of a flat, closed, essentially annular washer with the finger-like appendages 22 bent upward, toward the head, from its outer edge. The appendages 22, in their region that is integrally connected to the ring section 21, have a transition section 221 that is curved outward in a convex fashion, which transitions into a middle part 222 that rests against the head contour 122. The appendages 22 in this case are made of a spring-elastic material and the transition section 221 produces an advantageous spring action with which the middle part 222 is pressed against the head contour 122 under the spring-elastic force. The material selection and/or geometry, the width, the thickness, of the appendage 22 here, particularly in the transition section 221, is used to adjust the spring-elastic pressing force so that as the screw is screwed in, the least possible friction forces are generated, so that the securing element 2 stops rotating early or soon after the first contact with the surface of the foundation and scratch marks in the foundation are avoided, which could also be disadvantageous when generating the holding force for preventing a reverse rotation.

The free end sections 223 of the appendages 22 are bent toward the axis of the screw 1. The clearance between the top surface of the ring section 21 oriented toward the screw head 1 and the underside of the end sections 223 is at least as great as the height of the head 12 in the axial direction. This embodiment permits the securing element 2 to be fixed to the screw 1 in a captive fashion ahead of time. With a corresponding embodiment of the screw head 12, which, at least in the edge region of its top surface, is provided with or has a surface structure, which exerts an inhibiting action and cooperates with the end sections 223, this region can also be included in the embodiment of the anti-loosening means. The surface contour of the screw head 12 or similarly also of a nut can extend, for example, over only a lower circumferential region of the screw head 12 or nut that is oriented toward the surface of the base, is radially broadened, or is delimited by a circumferential groove and thus constitutes or forms a shoulder so that a tool can still be placed onto it in the upper circumferential region. In this instance, the appendages 22 extend across the circumference region provided with the inhibiting surface structure and embrace the shoulder with their end sections 223, which are directed radially inward and engage in the groove that is likewise provided there.

Through a corresponding embodiment of the press-in projections 231, these can be suitably matched to different material properties of the surface of the foundation or work piece, such as so that they penetrate reliably even into harder surfaces and produce a stable hold because they are provided with more or less sharp, optionally hardened tips. The flanks can be designed so that as the screw 1 is screwed in, they prevent for example a further rotation as quickly as possible after contact with the surface is achieved, which is why, for example, the flanks 233 facing the front in the tightening direction are as steep as possible and can possibly also be somewhat inclined in the tightening direction. In addition, the rear-facing flank 232 of the press-in projections 231 situated or positioned at the back in the tightening direction can be suitably matched in accordance with the surface properties. It is also possible for the press-in projections 231 to not be bent in the inner edge region of the ring section 21, but rather for them to be partially punched out from the washer surface and bent downward away from the head 12. It is also possible, but less effective in most cases, for the projections 231 to be turned inside out by embossing.

The securing element 2 shown in FIGS. 1A-1D can advantageously be manufactured as a stamped and bent part or molded part comprising a flat sheet metal disc. It can also be manufactured as a molded part.

FIG. 2A clearly shows the arrangement of the securing element 2 on the head 12 of the screw 1 with the ring section 21 and the middle parts 222 of the appendages 22. The fixing elements 23 of the securing element 2 protrude downward. The outer diameter d1 of the ring section 21 (see FIG. 1D) in this case corresponds approximately to the diameter of the head 12, while the inner diameter d2 of the ring section 21 is slightly greater than the outer diameter d3 of 5 the shaft 11.

Figures 2B, 2C:
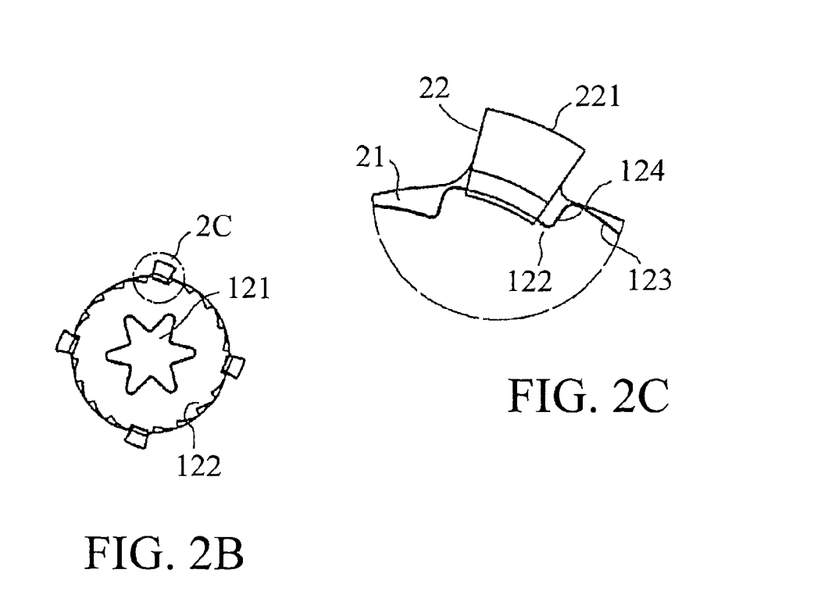
FIGS. 2B-C shows the screw with the securing element in a top view and an enlarged detail of the top view.

As shown in greater detail in FIGS. 2B and 2C, which show the head 12 with the securing element 2 in position, in a top view (i.e., FIG. 2B) and in an enlarged detail in FIG. 2C, in the tightening direction of the screw 1, the head contour 122 has cross-sectionally flat flanks that slope increasingly inward toward the axis of the screw 1 in the 10 tightening direction, which transition into one another by steep flanks 124. The transition regions between the flat and steep flanks 123, 124 are rounded. In the exemplary embodiment shown, the flat flanks 123 are also slightly curved outward in a convex fashion. The appendages 22, which rest in position by their middle parts 222, are bent inward against the outer circular circumference in accordance 15 with the curve of the flat flanks 123 so that a large-area contact with a low friction in the tightening direction and a secure support against the steep flanks 124 in the loosening direction, opposite the tightening direction, is produced and thus a reliably functioning anti-loosening means. In the tightened state of the screw 1, it thus cannot come unscrewed by itself in the reverse direction. The breadth of the 20 middle part 222 in the circumferential direction is shorter than the breadth of a flat flank 123 in the circumferential direction. The convex curvature of the flat flanks 123 toward the outside achieves an improved sliding effect compared to a flank that is straight in cross-section because the inclination angle of the flank relative to the middle part becomes flatter with increasing deflection of the middle part 222 as the spring force increases. The screw 1 can easily be actuated by a tool inserted into the tool-receiving socket 121. Alternatively to the exemplary embodiment shown, the tool-receiving socket can also protrude out from the surface of the screw head 12 and can, for example, be embodied as hexagonal.

Figure 3:
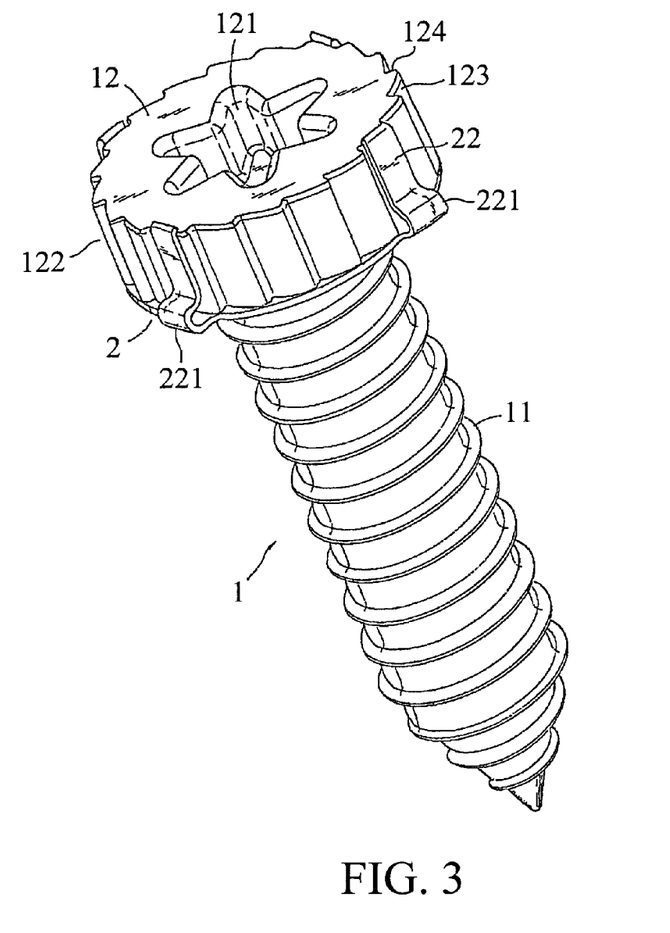
FIG. 3 is an enlarged perspective view of the screw according to FIG. 2A, with the securing element.

FIG. 3 shows the screw according to FIG. 2A, with the head contour 122 according to FIGS. 2B and 2C and the securing element 2 shown in a perspective view. The transition section 221 that protrudes outward in convex fashion advantageously contributes to the spring-elastic property of the appendage 22.

Figure 4:
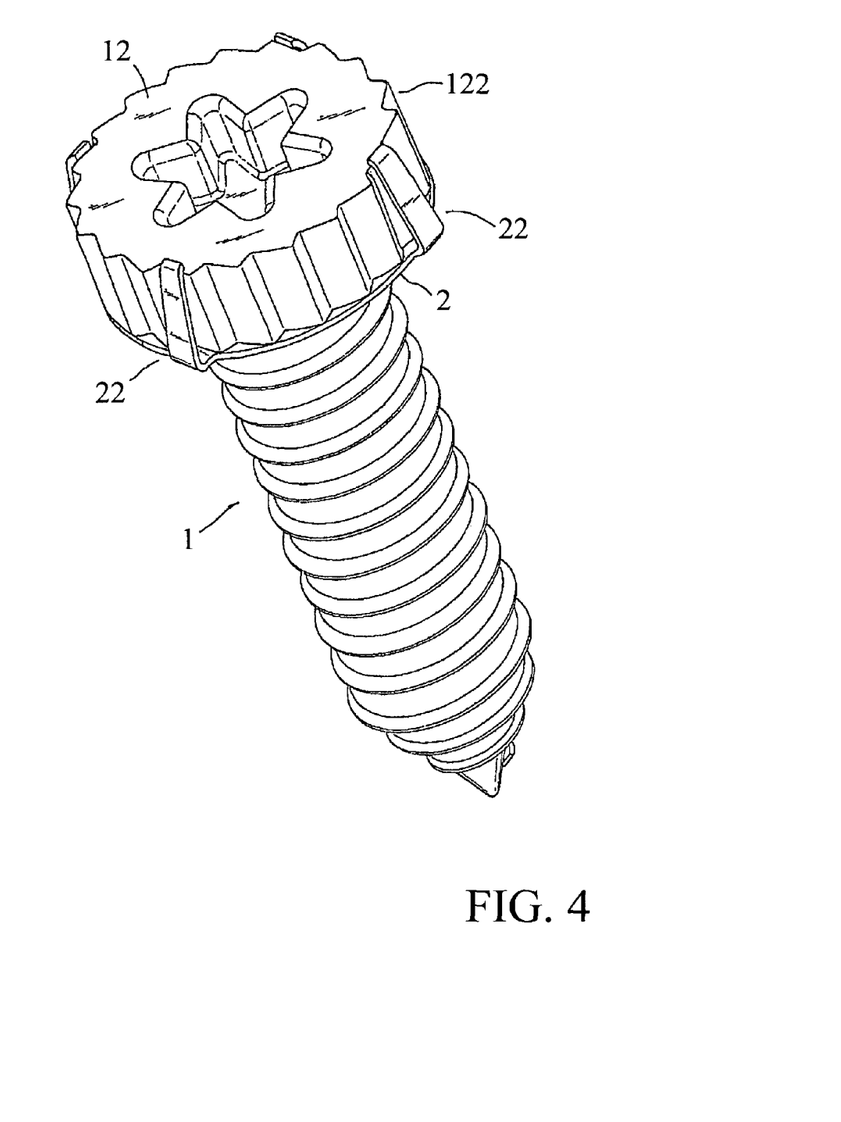
FIG. 4 shows the screw according to FIG. 3 with a different embodiment of a securing element.
Figure 5:
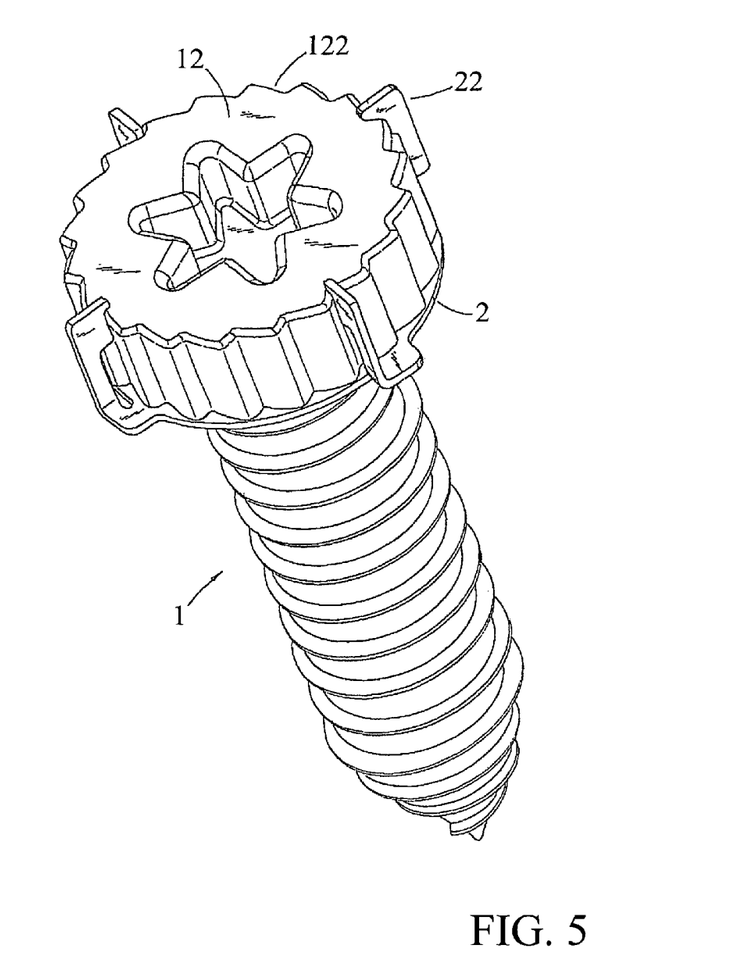
FIG. 5 shows the screw according to FIG. 3 with another embodiment according to this invention, of a securing element.

Other exemplary embodiments of this invention, for screws with anti-loosening means in which the securing elements 2 are differently embodied are shown in FIGS. 4 and 5.

In the exemplary embodiment according to FIG. 4, the appendage 22, after the bend, extends in a straight line until it reaches the top surface of the head 12 and rests against the head contour 122 only in the edge region between the top surface and the circumference surface of the head 12, which changes the lever forces of the appendage 22 acting in opposition to the spring-elastic force and changes the sliding surface in comparison to the preceding exemplary embodiment.

In the exemplary embodiment according to FIG. 5, the appendage 22 extends radially relative to the ring section 21 and is bent laterally upward from a flat bridge piece pointing radially outward from the ring section 21 and in its upper section, has an edge region protruding radially inward, which is brought into contact with the head contour 122, as well as a nose-like projection that embraces the edge region of the top surface of the head 12. This embodiment of the securing element 2 can also be advantageously produced in the form of a stamped and bent part.

The securing disk 2 can be used in connection with different screws 1 and can be adapted as needed to different head shapes and can also be adjusted to different surface properties of the foundation or of work pieces. It is also possible to use it in connection with nuts in order to prevent them from loosening Thus, the outer contour, for example in its circumference region adjacent to the ring section 21, can be provided with or have a head contour 122 that has the above-described surface structure with flat and steep flanks, which are matched to the appendages 22 in their length along the circumference surface of the nut, such as the head contour does not have to extend over the entire height of the nut. The bent-inward end sections 223 also embrace a shoulder formed by a radial projection or a circumferential groove, as described above in connection with the screw head 12. The remaining circumference region of the nut remote from the ring section 21 can be provided with or have the usual contour for the placement of a tool, e.g. a hexagon.

The invention claimed is:
1. An anti-loosening screw apparatus, comprising:
a screw (1) including a head (12) with a top surface and a circumference surface that protrudes radially from the head (12), wherein at least one of the head (12) and the circumference surface includes a surface structure comprising first flanks (123) that slope in a tightening direction of the screw (1), which transition into one another by second flanks (124) that slope at a steeper angle than the first flanks (123) and in a direction opposite from the tightening direction; and
a securing element (2) including a ring section (21) positionable around a shaft (11) of the screw (1) under a head (12) of the screw and with the screw (1) screwed to a base, to prevent the screw (1) from turning back in a direction opposite the tightening direction;
at least one projection (231) extending from the ring section (21) of the securing element (2) on a side opposite the head (12) of the screw (1) and oriented toward an associated surface of the base, wherein the at least projection is pressed into a surface as the screw (1) is tightened; and finger-like appendages (22) extending from an outer circumference region of the ring section (21) and which when the securing element (2) is in an installed position extend along a circumference of the head (12) and under spring-elastic forces of the securing element (2) contact with the surface structure of the head (12) and exerts an inhibiting action against the second flanks (124) in the direction opposite from the tightening direction, wherein the appendages (22) have end sections (223) bent inward and disposed over the top surface of the head (12), an edge region of the top surface, or a circumferential groove in the top surface and containing the surface structure oriented away from the shaft (11).

2. The anti-loosening screw apparatus according to claim 1, wherein the appendages (22) are spring-elastic.

3. The anti-loosening screw apparatus according to claim 2, wherein the appendages (22) transition into the ring section (21) via a transition section (221) that is bent outward.

4. The anti-loosening screw apparatus according to claim 3, wherein the securing element (2) is a stamped and bent part or a molded part of metal or a molded part of plastic.

5. The anti-loosening screw apparatus according to claim 4, wherein the appendages (22) are bent in the outer circumference region and/or each of the at least one projection (231) is bent in an inner circumference region of the ring section (21).

6. The anti-loosening screw apparatus according to claim 5, wherein a clearance between the ring section (21) and the bent end section (223) corresponds to at least a height of the head (12).

7. The anti-loosening screw apparatus according to claim 6, wherein the surface structure with an inhibiting action is embodied on the circumference surface of the head (12) and/or on the top surface oriented away from the shaft (11).

8. The anti-loosening screw apparatus according to claim 7, wherein the first flanks (123) on the circumference surface of the head (12) have a cross-section that is rectilinear or convex toward the outside.

9. The anti-loosening screw apparatus according to claim 8, wherein a breadth of the appendages (22) in the tightening direction is at least as great as a breadth of the first flanks (123).

10. The anti-loosening screw apparatus according to claim 9, wherein the appendages (22) are broad in a circumference direction and are oriented to cross a circumference line in accordance with the contour of the first flanks (123) or the appendages (222) are broad in the radial direction.

11. The anti-loosening screw apparatus according to claim 10, wherein the at least one projection (231) is provided with a press-in tip.

12. The anti-loosening screw apparatus according to claim 1, further comprising having a surface structure that has an inhibiting action.

13. The anti-loosening screw apparatus according to claim 1, wherein the appendages (22) transition into the ring section (21) via a transition section (221) that is bent outward.

14. The anti-loosening screw apparatus according to claim 1, wherein the securing element (2) is a stamped and bent part or a molded part of metal or a molded part of plastic.

15. The anti-loosening screw apparatus according to claim 1, wherein the appendages (22) are bent in the outer circumference region and/or the at least one projection (231) each is bent in an inner circumference region of the ring section (21).

16. The anti-loosening screw apparatus according to claim 1, wherein a clearance between the ring section (21) and the bent end section (223) corresponds to at least a height of the head (12) or the shoulder in an axial direction of the screw (1).

17. The anti-loosening screw apparatus according to claim 7, wherein a breadth of the appendages (22) in the tightening direction is at least as great as a breadth of the first flanks (123).

18. The anti-loosening screw apparatus according to claim 1, further comprising more than one projection (231) each provided with a press-in tip.

\* \* \* \* \*